(12) United States Patent
Landry et al.

(10) Patent No.: US 12,441,351 B2
(45) Date of Patent: Oct. 14, 2025

(54) SYSTEM AND METHOD FOR GENERATING, MONITORING, AND CORRECTING AN ALERT FOR AN OCCUPANT OF A VEHICLE

(71) Applicant: GM Global Technology Operations LLC, Detroit, MI (US)

(72) Inventors: Steven Landry, Royal Oak, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 402 days.

(21) Appl. No.: 18/049,452

(22) Filed: Oct. 25, 2022

(65) Prior Publication Data

US 2024/0132096 A1 Apr. 25, 2024
US 2024/0227841 A9 Jul. 11, 2024

(51) Int. Cl.
*B60W 50/16* (2020.01)
*B60W 40/09* (2012.01)
*B60W 50/10* (2012.01)

(52) U.S. Cl.
CPC ............ *B60W 50/16* (2013.01); *B60W 40/09* (2013.01); *B60W 50/10* (2013.01); *B60W 2540/043* (2020.02)

(58) Field of Classification Search
CPC ....... B60W 50/16; B60W 50/10; B60W 40/09
See application file for complete search history.

(56) References Cited

U.S. PATENT DOCUMENTS 11,873,000 B2 * 1/2024 Ahire .................... B60W 50/08
11,904,866 B2 * 2/2024 Farooq ................ G06F 16/9035

* cited by examiner

*Primary Examiner* — Luke Huynh
(74) *Attorney, Agent, or Firm* — Vivacqua Crane, PLLC (57) ABSTRACT

A vehicle includes a system for generating, monitoring, and correcting an alert for an occupant of the vehicle. The system further includes multiple on-board input devices for generating a visual alert signal, an audio alert signal, and a haptic alert signal for an associated one of the visual notification, the audio notification, and the haptic notification received from notification devices. The system further includes a computer having one or more processors and a non-transitory computer readable storage medium (CRM) storing instructions. The processor is programmed to determine a priority level of the alert, compare the priority level to a predetermined priority level threshold, and generate a reporting activation signal in response to the processor determining that the priority level is below the predetermined priority level threshold. The notification devices generates in real-time an error notification to indicate to the occupant that the notification characteristic is below the predetermined quality threshold.

20 Claims, 4 Drawing Sheets

SYSTEM AND METHOD FOR GENERATING, MONITORING, AND CORRECTING AN ALERT FOR AN OCCUPANT OF A VEHICLE

INTRODUCTION

The present disclosure relates to vehicle systems for generating alerts for occupants of the vehicle, and more particularly to system for generating, monitoring, and correcting in real-time the alerts.

Vehicle systems can include notification devices for alerting one or more occupants of conditions associated with the vehicle. For example, a vehicle monitoring system can include a speaker that emits a chime in response to the vehicle monitoring system determining that a fuel level is below a predetermined threshold level. However, the occupant may operate the vehicle with the windows lowered and a volume of an infotainment system above a predetermined level. As a result, the occupant may not hear the chime associated with the fuel level being below the predetermined threshold level. In another example, the vehicle monitoring system can include a speaker that is damaged such that the speaker does not emit a chime at a volume that may be heard by the occupant. The damaged speaker and any other notification devices of the vehicle monitoring system may cause an electrical short than can damage other components of vehicle systems. As a result, the damaged notification devices may increase the consumption of vehicle resources (e.g., battery resources, processing resources, etc.) used to operate the vehicle monitoring system among other examples.

Thus, while existing systems achieve their intended purpose, there is a need for a new and improved system that addresses these issues.

SUMMARY

According to several aspects of the present disclosure, a vehicle includes a system for generating, monitoring, and correcting an alert for an occupant of the vehicle, The system includes multiple notification devices for generating the alert, with the alert being a visual notification, an audio notification, or a haptic notification. The system further includes multiple on-board input devices for detecting the visual notification, the audio notification, and the haptic notification and generating a visual alert signal, an audio alert signal, and a haptic alert signal for an associated one of the visual notification, the audio notification, and the haptic notification. The system further includes a having one or more processors electrically connected the notification devices. The computer further includes a non-transitory computer readable storage medium (CRM) storing instructions, such that the processor is programmed to determine a notification characteristic based on the visual alert signal, the audio alert signal, or the haptic alert signal received from the associated notification device. The processor is further programmed to compare the notification characteristic to a predetermined quality threshold. The processor is further programmed to determine a priority level of the alert, in response to the processor determining that the notification characteristic is below the predetermined quality threshold. The processor is further programmed to compare the priority level to a predetermined priority level threshold. The processor is further programmed to generate a reporting activation signal, in response to the processor determining that the priority level is below the predetermined priority level threshold. The notification devices generates in real-time an error notification to indicate to the occupant that the notification characteristic is below the predetermined quality threshold, in response to the associated notification device receiving the reporting activation signal from the processor.

In one aspect, the processor is further programmed to determine a status of the associated notification device, in response to the processor determining that the priority level is not below the predetermined priority level threshold. The processor is further programmed to compare the status to a predetermined use threshold for the associated notification device; and generate a corrective activation signal, in response to the processor determining that the associated notification device is not being used as intended such that the notification characteristic is below the predetermined quality threshold.

In another aspect, the associated notification device generates in real-time a corrected notification, in response to the associated notification device receiving the corrective activation signal from the processor, with the corrected notification having a corrected notification characteristic that is not below the predetermined quality threshold.

In another aspect, one or more of the other notification devices generates in real-time a corrective instruction, in response to the associated notification device receiving the corrective activation signal from the processor. The corrective instruction instructs the occupant of the vehicle to use the associated notification device based on the predetermined use.

In another aspect, the processor is further programmed to compare the notification devices to a list of alternative modalities and compare a user ID of the occupant to a plurality of user profiles stored in the CRM, in response to the processor determining that one or more of the notification devices includes one of the alternative modalities. Each of the user profiles includes a list of associated preferred modalities. The processor is further programmed to generate a user-specific activation signal, in response to the processor determining that one or more of the notification devices includes one of the alternative modalities and one of the preferred modalities. The notification device associated with one of the alternative modalities and one of the preferred modalities generates in real-time a user-specific alert, in response to the notification device receiving the user-specific activation signal.

In another aspect, the processor is further programmed to generate the corrective activation signal, in response to the processor determining that the notification devices do not include one of the alternative modalities and one of the preferred modalities.

In another aspect, the processor is further programmed to store the error notification in the CRM.

In another aspect, the processor is further programmed to generate an actuation signal, and one or more of the notification devices generates an associated one of the visual notification, the audio notification, and the haptic notification in response to receiving the actuation signal from the processor.

In another aspect, the notification devices includes a display device for generating the visual notification, a speaker for generating the audio notification, and a haptic device for generating the haptic notification.

In another aspect, the on-board input devices includes a camera for generating the visual alert signal in response to the camera detecting the visual notification, a microphone for generating the audio alert signal in response to the microphone detecting the audio notification, and a haptic sensor for generating the haptic alert signal in response to the haptic sensor detecting the haptic notification.

According to several aspects of the present disclosure, a computer is provided for a system of a vehicle, with the system generating, monitoring, and correcting an alert for an occupant of the vehicle. The computer includes one or more processors electrically connected multiple notification devices of the system, with the notification devices generating the alert. The alert includes a visual notification, an audio notification, and/or a haptic notification. The computer further includes a non-transitory computer readable storage medium (CRM) storing instructions, such that the processor is programmed to determine a notification characteristic based on one of the visual alert signal, the audio alert signal, and the haptic alert signal received from the associated notification device. The processor is further programmed to compare the notification characteristic to a predetermined quality threshold. The processor is further programmed to determine a priority level of the alert, in response to the processor determining that the notification characteristic is below the predetermined quality threshold. The processor is further programmed to compare the priority level to a predetermined priority level threshold. The processor is further programmed to generate a reporting activation signal, in response to the processor determining that the priority level is below the predetermined priority level threshold. One or more of the notification devices generates in real-time an error notification to indicate to the occupant of the vehicle that the notification characteristic is below the predetermined quality threshold, in response to the associated notification device receiving the reporting activation signal from the processor.

In one aspect, the processor is further programmed to determine a status of the associated notification device, in response to the processor determining that the priority level is not below the predetermined priority level threshold. The processor is further programmed to compare the status to a predetermined use threshold for the associated notification device. The processor is further programmed to generate a corrective activation signal, in response to the processor determining that the associated notification device is not being used as intended such that the notification characteristic is below the predetermined quality threshold.

In another aspect, the associated notification device generates in real-time a corrected notification, in response to the associated notification device receiving the corrective activation signal from the processor. The corrected notification has a corrected notification characteristic that is not below the predetermined quality threshold.

In another aspect, one or more of the other notification devices generates in real-time a corrective instruction, in response to the associated notification device receiving the corrective activation signal from the processor. The corrective instruction instructs the occupant of the vehicle to use the associated notification device based on the predetermined use.

In another aspect, the processor is further programmed to compare the notification devices to a list of alternative modalities. The processor is further programmed to compare a user ID of the occupant to a plurality of user profiles stored in the CRM, in response to the processor determining that one or more of the notification devices includes one of the alternative modalities and each of the user profiles includes a list of associated preferred modalities. The processor is further programmed to generate a user-specific activation signal, in response to the processor determining that one or more of the notification devices includes one of the alternative modalities and one of the preferred modalities. The notification device associated with one of the alternative modalities and one of the preferred modalities generates in real-time a user-specific alert, in response to the notification device receiving the user-specific activation signal.

In another aspect, the processor is further programmed to generate the corrective activation signal, in response to the processor determining that the notification devices do not include one of the alternative modalities and one of the preferred modalities.

In another aspect, the processor is further programmed to store the error notification in the CRM.

According to several aspects of the present disclosure, a method is provided for operating a vehicle having a system. The method includes generating, using multiple notification devices of the system, an alert for an occupant of the vehicle. The alert includes a visual notification, an audio notification, and/or a haptic notification. The method further includes generating, using multiple on-board input devices of the system, a visual alert signal, an audio alert signal, and a haptic alert signal for an associated one of the visual notification, the audio notification, and the haptic notification. The method further includes determining, using one or more processors of a computer for the system, a notification characteristic based on one of the visual alert signal, the audio alert signal, and the haptic alert signal received from the associated notification device. The computer further includes a non-transitory computer readable storage medium (CRM) storing instructions. The method further includes comparing, using the processor, the notification characteristic to a predetermined quality threshold. The method further includes determining, using the processor, a priority level of the alert in response to the processor determining that the notification characteristic is below the predetermined quality threshold. The method further includes comparing, using the processor, the priority level to a predetermined priority level threshold. The method further includes generating, using the processor, a reporting activation signal in response to the processor determining that the priority level is below the predetermined priority level threshold. The method further includes generating, using at least one of the notification devices, in real-time an error notification to indicate to the occupant that the notification characteristic is below the predetermined quality threshold in response to the associated notification device receiving the reporting activation signal from the processor.

In one aspect, the method further includes determining, using the processor, a status of the associated notification device in response to the processor determining that the priority level is not below the predetermined priority level threshold. The method further includes comparing, using the processor, the status to a predetermined use threshold for the associated notification device. The method further includes generating, using the processor, a corrective activation signal in response to the processor determining that the associated notification device is not being used as intended such that the notification characteristic is below the predetermined quality threshold.

In another aspect, the method further includes comparing the notification devices to a list of alternative modalities. The method further includes comparing, using the processor, a user ID of the occupant to a plurality of user profiles stored in the CRM, in response to the processor determining that one or more of the notification devices includes one of the alternative modalities and each of the user profiles includes a list of associated preferred modalities. The method further includes generating, using the processor, a user-specific activation signal in response to the processor determining that one or more of the notification devices includes one of the alternative modalities and one of the preferred modalities. The method further includes generating, using the notification device associated with one of the alternative modalities and one of the preferred modalities, in real-time a user-specific alert in response to the notification device receiving the user-specific activation signal.

In another aspect, the method further includes generating, using the processor, the corrective activation signal in response to the processor determining that the notification devices do not include one of the alternative modalities and one of the preferred modalities.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a vehicle 100 (FIG. 1) having a system 102 (system) with a computer 104 for generating, monitoring, and correcting an alert for an occupant of the vehicle. As described in detail below, the system 102 include multiple notification devices 106 for generating the alerts associated with the vehicle 100 and multiple on-board input devices 108 (input devices) for monitoring the alerts. As described in detail below, the computer 104 is configured to determine, based on feedback from the input devices 108, that the notification device 106 is obstructed from generating the alert, such that the occupant may not notice the alert, because the notification device 106 is being improperly used or damaged. In one non-limiting example, the notification device 106 may be damaged and create an electrical short circuit, which may cause excessive wear and/or damage to other components of the vehicle and consume vehicle resources (e.g., battery resources, etc.). The computer 104 is configured to actuate one or more notification devices to generate corrected alerts that can be perceived by the occupant and further notify the occupant of the obstructed notification device 106. As a result, the occupant may repair, replace, or remedy the obstructed notification device, which may in turn prevent damage to other components of the vehicle (e.g., damage associated with the electrical short circuit, etc.) and/or decrease consumption of vehicle resources (e.g., battery resources, etc.).

Non-limiting examples of the vehicle 100 (e.g., a sedan, a light duty truck, a heavy duty truck, a sport utility vehicle, a van, a motor home, a passenger bus, a commercial truck, a waste collection vehicle, a utility vehicle, a delivery vehicle, an emergency vehicle, etc.) may include autonomous vehicles, semi-autonomous vehicles, or a non-autonomous (manual) vehicles with associated propulsion systems (e.g., an internal combustion engine and/or an electric motor, hydrogen fuel cells, etc.).

Figure 1:
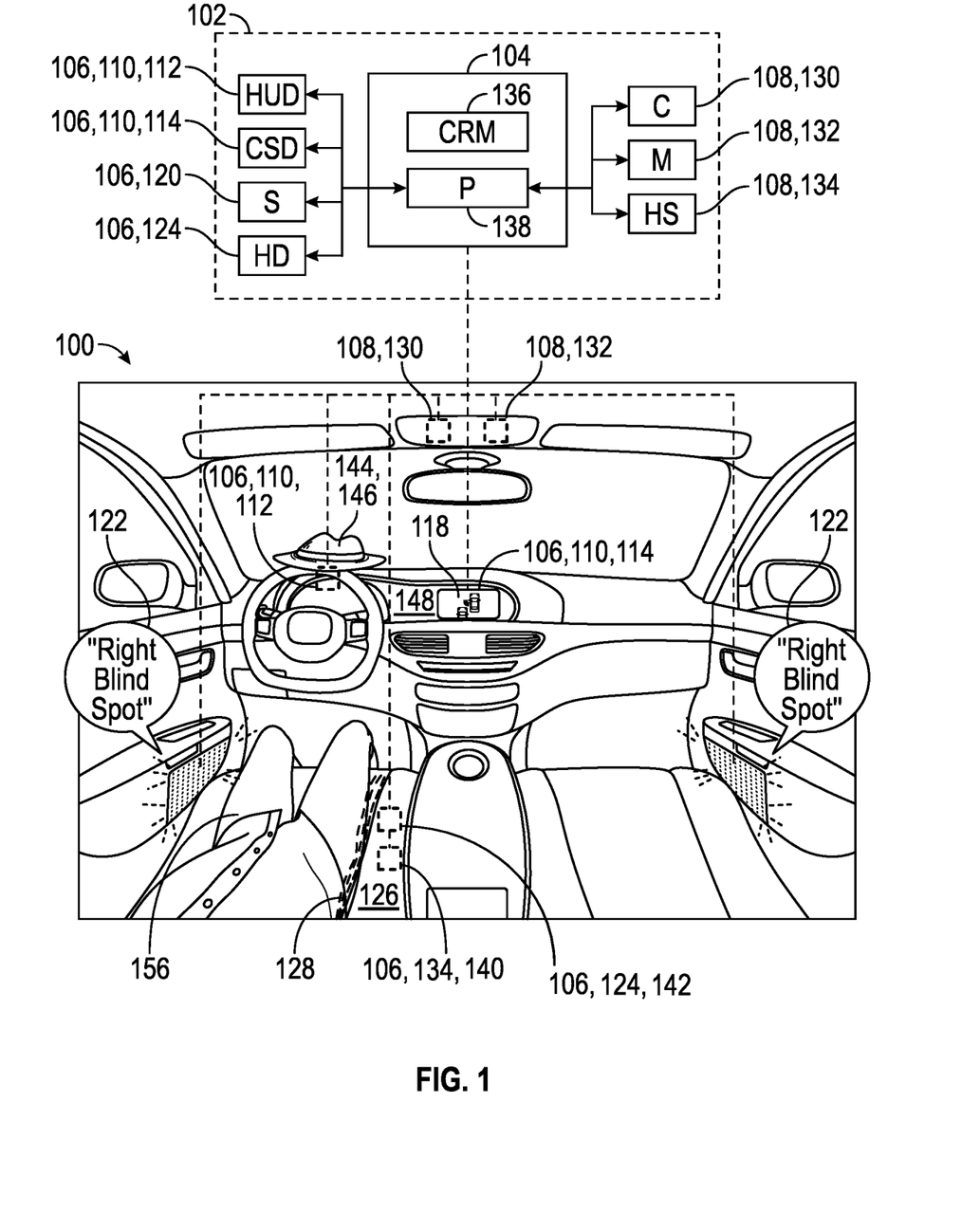
FIG. 1 is a schematic view of one example of a vehicle having a system with multiple notification devices for generating an alert and a computer for actuating one or more notification devices to correct the alert, with the computer actuating a haptic device for generating a haptic notification and a speaker for generating an audio notification in response to the computer determining that a display device is obstructed from generating a visual notification.

Referring to FIG. 1, the notification devices 106 can be components that are mounted to the vehicle and shared with other vehicle systems (e.g., a side blind zone alert system 102, a low fuel alert system, a lane departure warning system, a forward collision alert system, a rear cross traffic alert system, a hidden Vulnerable Road User alert system, etc.). One non-limiting example of the notification devices 106 may include a display device 110 [e.g., Head-Up Display device 112 (HUD), an Augmented Reality Head-Up Display device (ARHUD device), a center stack display device 114, a Human Machine Interface (HMI), an instrument cluster display device, etc.] for generating the alert in the form of a visual notification 118 (e.g., an icon, a text, a color, etc.). The visual notification 118 associated with a side blind zone alert system 102 may include an icon, a text, a color, etc. for indicating that another vehicle is positioned in a blind zone of the vehicle 100. Another non-limiting example of the notification devices 106 may include a speaker 120 [e.g., a speaker of an infotainment system, etc.] for generating the alert in the form of an audio notification 122 (e.g., a chime, a spoken announcement, etc.). The audio notification 122 associated with the side blind zone alert system 102 may include a repeating intermittent chime, a spoken announcement, etc. for indicating that another vehicle is positioned in the blind zone of the vehicle 100. Still another non-limiting example of the notification devices 106 may include a haptic device 124 [e.g., a vibration motor 142, etc.] mounted to a thigh bolster 126, steering wheel, headrest, etc. for generating the alert in the form of a haptic notification 128. The haptic notification 128 associated with the side blind zone alert system 102 may include a repeating intermittent vibration etc. for indicating that another vehicle is positioned in the blind zone of the vehicle 100. In other examples, the visual notification, the audio notification, and/or the haptic notification may indicate other conditions monitored by the other associated vehicle systems.

The input devices 108 are mounted to the vehicle 100 and positioned within a cabin of the vehicle 100 for monitoring the alerts generated by the notification devices 106 and generating signals associated with the alerts. More specifically, the input devices 108 may include a camera 130 configured to detect the visual notification and generate a visual alert signal in response to the camera detecting the visual notification. The input devices 108 may further include a microphone 132 for generating an audio alert signal, in response to the microphone 132 detecting the audio notification. The input devices 108 may further include a haptic sensor 134 for generating a haptic alert signal, in response to the haptic sensor 134 detecting the haptic notification.

The computer 104 includes one or more processors 136 mounted to the vehicle 100 and electrically connected to the notification devices 106 and the input devices 108. The computer 104 further includes a non-transitory computer readable storage medium 138 (CRM) storing instructions, such that the processor 136 is programmed to determine a notification characteristic based on one of the visual alert signal, the audio alert signal, and the haptic alert signal received from the associated notification devices 106. The processor 136 is further programmed to compare the notification characteristic to a predetermined quality threshold.

In the non-limiting example illustrated in FIG. 1, the processor 136 may be programmed to receive the display alert signal from the camera 130 and determine the notification characteristic in the form of a measured image setting (e.g., contrast, dynamic range, spatial resolution, noise, artifacts, displayed object, etc.) based on the image alert signal received from the camera 130. The processor 136 may be further programmed to compare the measured image setting to the predetermined quality threshold (e.g., a predetermined image setting threshold). In the non-limiting example of FIG. 2, the processor 136 may be further programmed to receive the audio signal from the microphone 132 and determine the notification characteristic [e.g., a measured signal-to-noise ratio (measured SNR)] based on the audio alert signal received from the microphone 132. The processor 136 may be further programmed to compare the measured SNR to the predetermined quality threshold (e.g., a predetermined SNR threshold). In the non-limiting example illustrated in FIG. 3, the processor 136 may be programmed to receive one or more haptic signals from one or more haptic sensors 134 and determine the notification characteristic based on the haptic signals. The haptic sensors 134 may include a vibration sensor 140 mounted to the vibration motor 142 and/or the thigh bolster 126 for detecting a vibration generated by the vibration motor 142. The haptic sensors 134 may further include the camera 130 for detecting that the occupant is spaced from the thigh bolster 126 by a measured distance D. The processor 136 may be further programmed to compare the measured distance $D_{meas}$ to the predetermined quality threshold (e.g., a maximum distance threshold $D_{max}$ between the occupant and the haptic device 124).

The processor 136 may be further programmed to determine a priority level of the alert, in response to the processor 136 determining that the notification characteristic is below the predetermined quality threshold. The processor 136 may determine that the priority level of alerts associated with vehicle safety systems (e.g., a side blind zone alert system 102, a lane departure warning system, a forward collision alert system, a rear cross traffic alert system, a hidden Vulnerable Road User alert system, etc.) is critical, and the priority of other vehicle systems (e.g., a low fuel alert system, a door ajar system, a low tire pressure alert system, etc.) is not critical. The processor 136 may be further programmed to compare the priority level to a predetermined priority level threshold (e.g., a critical priority level). The processor 136 is further programmed to generate a reporting activation signal, in response to the processor determining that the priority level is below the predetermined priority level threshold.

In the non-limiting example of FIG. 1, the processor 136 may be programmed to determine the priority level of the alert, in response to the processor 136 determining that the measured image setting is below the predetermined image setting threshold. In the non-limiting example of FIG. 2, the processor 136 may be programmed to determine the priority level of the alert, in response to the processor 136 determining that the measured SNR is below the predetermined SNR threshold. In the non-limiting example of FIG. 3, the processor 136 may be programmed to determine the priority level of the alert, in response to the processor 136 determining that the measured distance $D_{meas}$ between the occupant and the haptic device 124 is greater than the predetermined maximum distance threshold $D_{max}$.

The processor 136 may be further programmed to determine a status of the associated notification device 106, in response to the processor determining that the priority level is not below the predetermined priority level threshold. The processor 136 may be programmed compare the status to a predetermined use threshold for the associated notification device 106. The processor 136 may be further programmed to generate a corrective activation signal, in response to the processor 136 determining that the associated notification device 106 is not being used as intended such that the notification characteristic is below the predetermined quality threshold.

In the non-limiting example of FIG. 1, the processor 136 may be programmed to determine that the status of the display device 110 (e.g., the HUD 112) includes an object 144 (e.g., a hat 146) placed on a dashboard 148 adjacent to the display device 110. The processor 136 may be programmed to compare the status to a predetermined use threshold (e.g., the location of the hat 146 relative to the path of light emitted by the HUD 112). The processor 136 may be further programmed to generate the corrective activation signal, in response to the processor 136 determining that the HUD 112 is not being used with an unobstructed path of light such that the measured image setting of the video notification is below the predetermined image setting threshold or the hat 146 entirely blocks the HUD 112 from projecting light onto a display surface (e.g., a windshield). In the non-limiting example of FIG. 2, the processor 136 may be programmed to determine that the status of the speaker 120 includes the cargo item 150 (e.g., a box 152) placed on a passenger seat 154 adjacent to the speaker 120. The processor 136 may be programmed to compare the status to a predetermined use threshold (e.g., the location of the cargo item 150 relative to a location of the speaker 120). The processor 136 may be further programmed to generate the corrective activation signal, in response to the processor 136 determining that the speaker 120 is not being used with an unobstructed path of sound to the occupant such that the measured SNR is below the predetermined SNR threshold. In the non-limiting example of FIG. 3, the processor 136 may be programmed to determine that the status of the haptic device 124 includes the occupant 156 being spaced from the haptic device 124 and/or the thigh bolster 126. The processor 136 may be programmed to compare the status to a predetermined use threshold (e.g., the distance between the occupant 156 and the haptic device 124). The processor 136 may be further programmed to generate the corrective activation signal, in response to the processor 136 determining that the haptic device 124 is not being used with the occupant's leg being positioned at the measured distance $D_{meas}$ within the maximum distance threshold $D_{max}$.

The associated notification device 106 generates in real-time a corrected notification, in response to the associated notification device 106 receiving the corrective activation signal from the processor 136. The corrected notification has a corrected notification characteristic that is not below the predetermined quality threshold. In the non-limiting example of FIG. 1, the display device 110 in the center stack display device 114 may display the visual notification, such that occupant has an unobstructed line of sight to the visual notification and the processor 136 determines that the measured image setting is not below the predetermined image setting threshold. In the non-limiting example of FIG. 2, the speaker 120 that is blocked by the cargo item 150 may emit the audio notification at a higher volume, such that the microphone detects the audio notification, and the processor determines that the measured SNR ratio is not below the predetermined SNR threshold.

The notification devices 106 are configured to generate in real-time an error notification to indicate to the occupant that the notification characteristic is below the predetermined quality threshold, in response to the associated notification device receiving the reporting activation signal from the processor 136. The processor is further programmed to store the error notification in the CRM 138. The other notification devices 106 generate in real-time a corrective instruction, in response to the associated notification device 106 receiving the corrective activation signal from the processor. The corrective instruction instructs the occupant 156 of the vehicle 100 to use the associated notification device 106 based on the predetermined use.

In the non-limiting example of FIG. 1, the speaker 120 may be configured to generate in real-time an error notification (e.g., a spoken announcement, etc.) indicating that the HUD 112 is obstructed, in response to the speaker 120 receiving the reporting activation signal from the processor 136. The speaker 120 may further generate in real-time the corrective instruction (e.g., spoken announcement) for the occupant to remove the object 144 (e.g., the hat 146) from the dashboard 148, in response to the speaker 120 receiving the corrective activation signal from the processor 136. In the non-limiting example of FIG. 2, the HUD 112 may be configured to generate in real-time a visual notification (e.g., a message, etc.) indicating that the speaker 120 is obstructed, in response to the HUD 112 receiving the reporting activation signal from the processor 136. The HUD 112 may further generate in real-time the corrective instruction that instructs the occupant to remove the cargo item 150 (e.g., the box 152) from the passenger seat 154, in response to the HUD 112 receiving the corrective activation signal from the processor 136. In the non-limiting example of FIG. 3, the speaker 120 may be configured to generate in real-time an error notification (e.g., a spoken announcement, etc.) indicating that the occupant is seated out-of-position and/or the haptic device 124 is obstructed, in response to the speaker 120 receiving the reporting activation signal from the processor 136. The speaker 120 may further generate in real-time the corrective instruction (e.g., spoken announcement) for the occupant to rest the legs against the thigh bolster 126, in response to the speaker 120 receiving the corrective activation signal from the processor 136.

The processor 136 may be further programmed to compare the notification devices 106 to a list of alternative modalities and compare a user ID of the occupant 156 to a plurality of user profiles stored in the CRM 138, in response to the processor 136 determining that one or more of the notification devices 106 is one of the alternative modalities. Each of the user profiles includes a list of associated preferred modalities. The processor 136 may be further programmed to generate a user-specific activation signal, in response to the processor 136 determining that the notification devices 106 is one of the alternative modalities and one of the preferred modalities. The notification device 106 associated with one of the alternative modalities and one of the preferred modalities generates in real-time a user-specific alert, in response to the notification device 106 receiving the user-specific activation signal.

Figure 2:
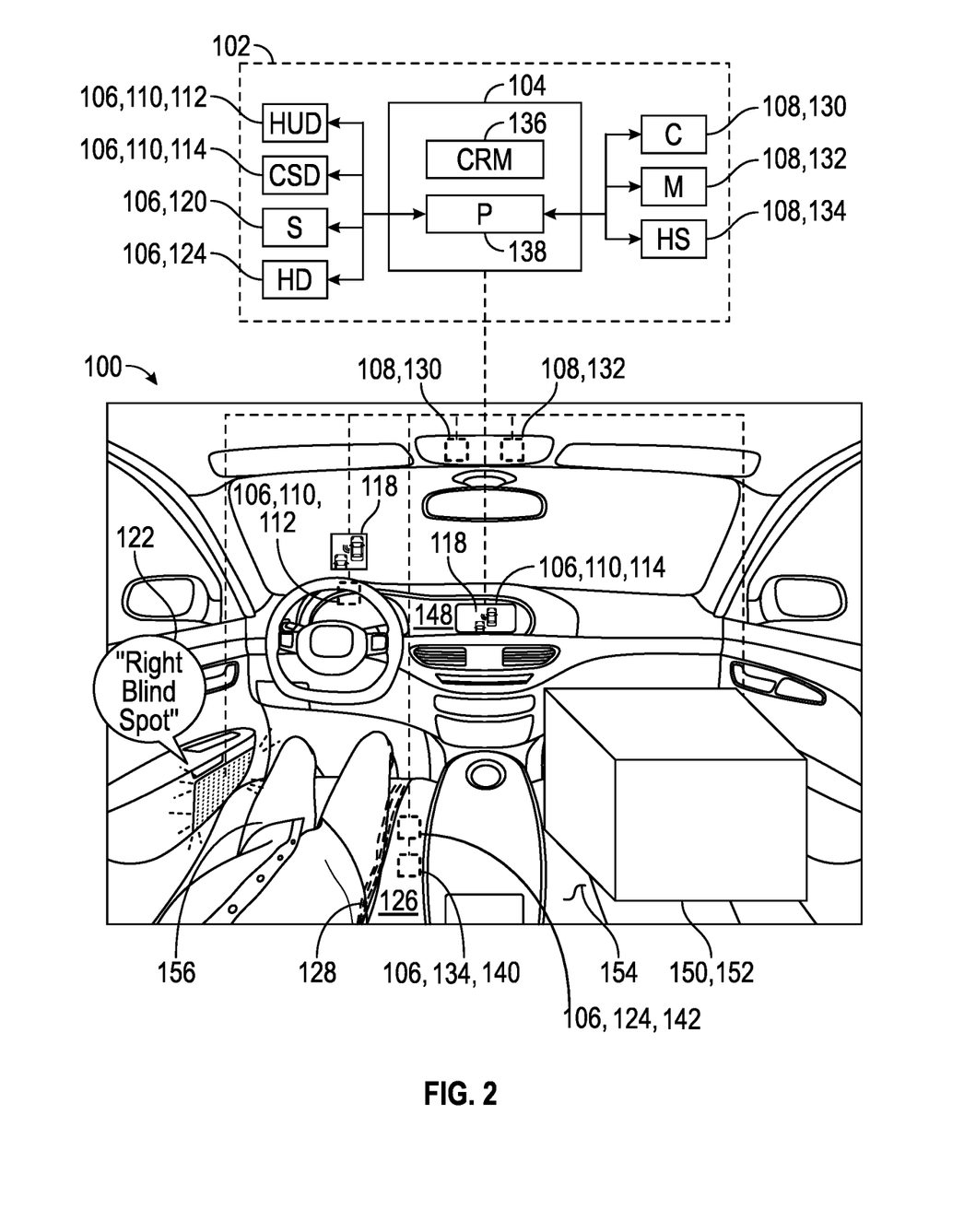
FIG. 2 is a schematic view of the vehicle of FIG. 1, illustrating the computer actuating the haptic device for generating the haptic notification and the display device for generating the visual notification in response to the computer determining that the speaker is obstructed from generating the audio notification.
Figure 3:
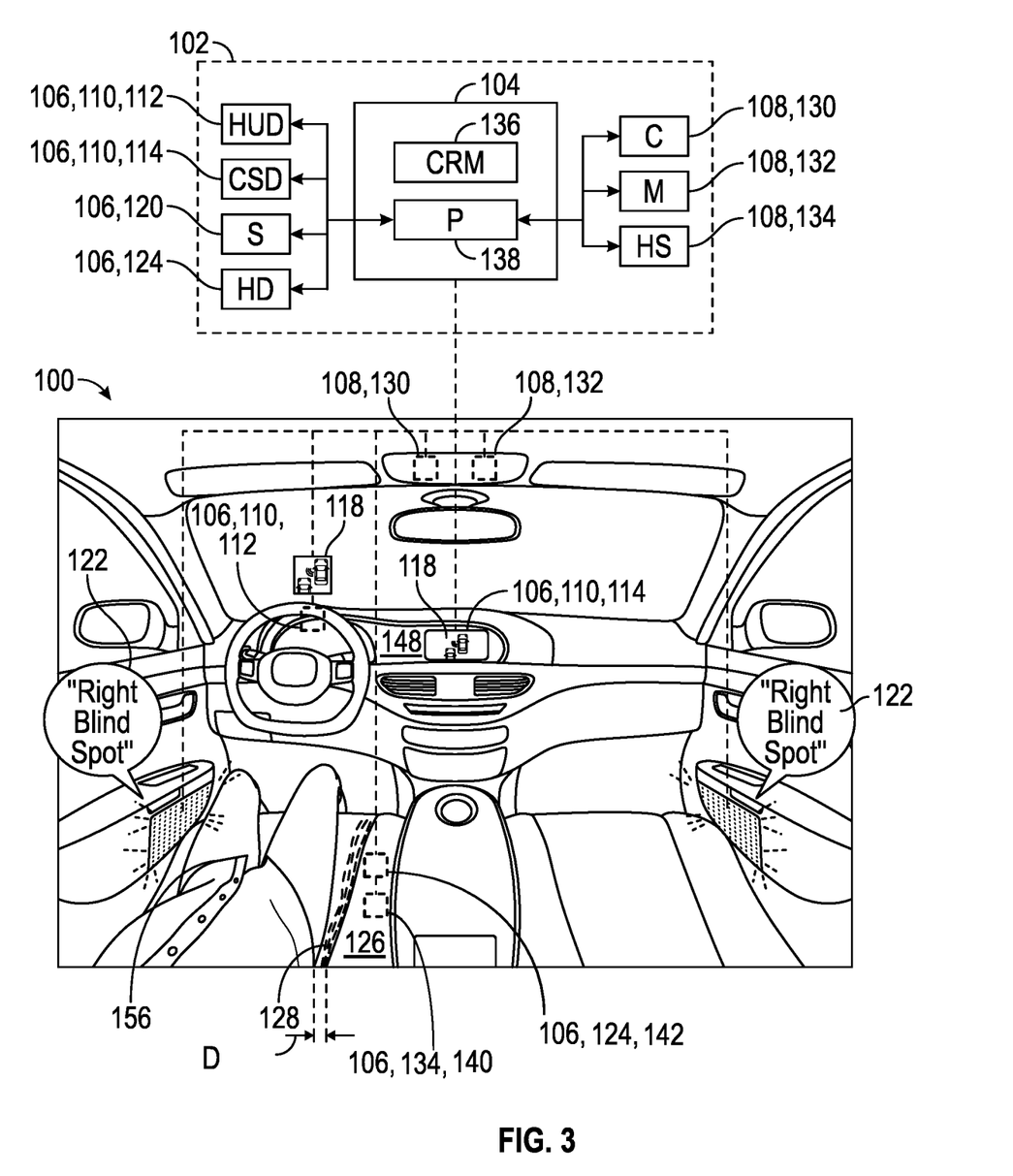
FIG. 3 is a schematic view of the vehicle of FIG. 1, illustrating the computer actuating the display device for generating the visual notification and the speaker for generating the audio notification in response to the computer determining that an occupant is spaced from the haptic device.

In the non-limiting example of FIG. 1, the processor 136 is programmed to compare the display device 110, the speaker 120, and the haptic device 124 to a list of alternative modalities and determine that the speaker 120 and the haptic device 124 are available alternative modalities. The processor 136 may be further programmed to compare the user ID of the occupant 156 to the user profiles stored in the CRM 138, in response to the processor 136 determining that one or more of the notification devices 106 is one of the alternative modalities. The processor 136 may be further programmed to generate a user-specific activation signal, in response to the processor 136 determining that one or more of the available alternative modalities is one of the preferred modalities for the occupant. The notification devices 106 (e.g., the speaker 120 and the haptic device 124), which is associated with one of the available alternative modalities and one of the preferred modalities, generates in real-time a user-specific alert, in response to the notification device 106 receiving the user-specific activation signal. In the example of FIG. 2, the processor 136 is further programmed to generate the user-specific activation signal, in response to the processor determining that the display device 110 and the haptic device 124 are available alternative modalities and preferred modalities for the occupant. The display device 110 generates the visual notification and the haptic device 124 generates the haptic notification, in response to the display device 110 and the haptic device 124 receiving the user-specific activation signal. In the example of FIG. 3, the processor 136 is further programmed to generate the user-specific activation signal, in response to the processor determining that the display device 110 and the speaker 120 are available alternative modalities and preferred modalities for the occupant. The display device 110 generates the visual notification and the speaker 120 generates the audio notification, in response to the display device 110 and the speaker 120 receiving the user-specific activation signal. In other examples, the preferred modalities for the occupant may exclude haptic notifications, such that the processor transmits the user-specific activation signal to only the display device 110 or the speaker 120.

The processor 136 may be further programmed to generate the corrective activation signal, in response to the processor 136 determining that the notification devices 106 do not include any of the available alternative modalities or preferred modalities. In one non-limiting example where the processor 136 determines that the display device 110 is obstructed and none of the remaining notification devices are available alternative modalities or preferred modalities, the processor may be programmed to generate the corrective activation signal.

Figure 4:
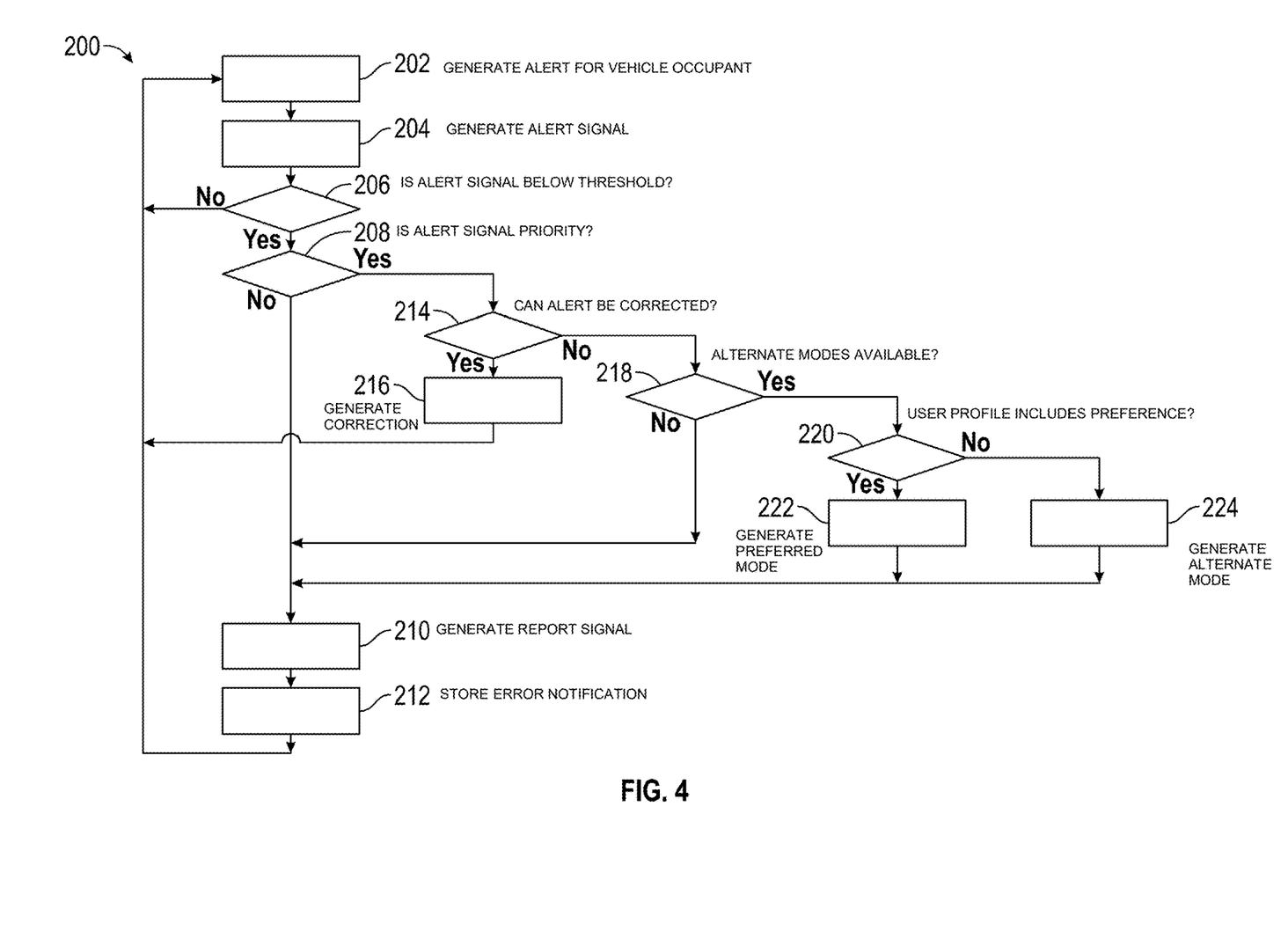
FIG. 4 is a flow chart of one example of a method of operating the ego vehicle of FIG. 1.

Referring to FIG. 4, a method 200 is provided for operating the system 102 of FIG. 1, with the system sharing notification devices 106 with another vehicle monitoring system (e.g., a side blind zone alert system 102, a low fuel alert system, a lane departure warning system, a forward collision alert system, a rear cross traffic alert system, a hidden Vulnerable Road User alert system, etc.) that monitors a vehicle parameter (e.g., vehicle processes, driving context, occupant behavior, etc.). The method 200 commences at block 202 with generating, using the notification devices 106, the alert for the occupant of the vehicle 100. The alert may be the visual notification, the audio notification, and/or the haptic notification associated with the other vehicle monitoring system. While this non-limiting example of the method commences with the occupant operating the vehicle 100, other examples of the method may begin when the occupant is positioned within the vehicle and is not operating the vehicle (e.g., when the vehicle is parked, etc.). The method 200 then proceeds to block 204.

At block 204, the method 200 further includes generating, using the input devices 108, the visual alert signal, the audio alert signal, and/or the haptic alert signal for an associated one of the visual notification, the audio notification, and the haptic notification. The method 200 then proceeds to block 206.

At block 206, the method 200 further includes receiving, using the processor 136, the visual alert signal, the audio alert signal, and/or the haptic alert signal from the associated input devices 108. The method 200 further includes determining, using the processor 136, the notification characteristic based on an associated one of the visual alert signal, the audio alert signal, and the haptic alert signal received from the associated notification device. The method 200 further includes comparing, using the processor 136, the notification characteristic to a predetermined quality threshold. If the processor 136 determines that the notification characteristic is below the predetermined quality threshold, the method 200 proceeds to block 208. If the processor 136 determines that the notification characteristic is not below the predetermined quality threshold, the method 200 returns to block 202.

In the non-limiting example illustrated in FIG. 1, the processor 136 receives the display alert signal from the camera 130 and determines the notification characteristic in the form of a measured image setting (e.g., contrast, dynamic range, spatial resolution, noise, artifacts, displayed object, etc.) based on the image alert signal received from the camera 130. The processor 136 may be further programmed to compare the measured image setting to the predetermined quality threshold (e.g., a predetermined image setting threshold). If the measured image setting is below the predetermined image quality threshold, the method 200 proceeds to block 208. If the measured image setting is not below the predetermined image quality threshold, the method 200 returns to block 202.

In the non-limiting example of FIG. 2, the processor 136 may be further programmed to receive the audio signal from the microphone 132 and determine the notification characteristic [e.g., the measured SNR] based on the audio alert signal received from the microphone 132. The processor 136 may be further programmed to compare the measured SNR to the predetermined quality threshold (e.g., the predetermined SNR threshold). If the measured SNR is below the predetermined SNR threshold, the method 200 proceeds to block 208. If the measured image setting is not below the predetermined SNR threshold, the method 200 returns to block 202.

In the non-limiting example illustrated in FIG. 3, the processor 136 may be programmed to receive one or more haptic signals from one or more haptic sensors 134 and determine the notification characteristic based on the haptic signals. The haptic sensors 134 may include a vibration sensor 140 mounted to the vibration motor 142 and/or the thigh bolster 126 for detecting a vibration generated by the vibration motor 142. The processor 136 may be further programmed to compare the measured distance $D_{meas}$ between the occupant and the haptic device 124 to the predetermined quality threshold (e.g., a maximum distance threshold $D_{max}$ between the occupant and the haptic device 124). If the measured distance $D_{meas}$ is greater than the maximum distance threshold $D_{max}$, the method 200 proceeds to block 208. If the measured distance $D_{meas}$ is not greater than the maximum distance threshold $D_{max}$, the method 200 returns to block 202.

At block 208, the method 200 further includes determining, using the processor, a priority level of the alert in response to the processor 136 determining that the notification characteristic is below the predetermined quality threshold. The method 200 further includes comparing, using the processor 136, the priority level to a predetermined priority level threshold. The processor 136 may determine that the priority level of alerts associated with vehicle safety systems (e.g., a side blind zone alert system 102, a lane departure warning system, a forward collision alert system, a rear cross traffic alert system, a hidden Vulnerable Road User alert system, etc.) is critical, and the priority of other vehicle systems (e.g., a low fuel alert system, a door ajar system, a low tire pressure alert system, etc.) is not critical. If the processor 136 determines that the priority level of the alert is not critical, the method 200 proceeds to block 210. If the processor 136 determines that the priority level of the alert is critical, the method 200 proceeds to block 212.

At block 210, the method 200 further includes generating, using the processor 136, the reporting activation signal, in response to the processor determining that the priority level of the associated alert is not critical. The method 200 further includes generating, using at least one of the notification devices, in real-time the error notification to indicate to the occupant that the notification characteristic is below the predetermined quality threshold such that the occupant may remove an obstruction from the notification device 106 and/or repair or replace the notification device 106.

At block 212, the method 200 further includes storing, using the processor 136, the error notification in the CRM 138. The error notification may be included in a report downloaded by an OBD scanner or other suitable diagnostic tool.

At block 214, the method 200 further includes determining, using the processor 136, whether the alert and/or the cabin environment can be corrected. More specifically, the method 200 further includes determining, using the input devices 108 and the processor 136, the status of the associated notification device 106 in response to the processor 136 determining that the priority level is not below the predetermined priority level threshold. The method 200 further includes comparing, using the processor 136, the status to the predetermined use threshold for the associated notification device. If the processor 136 determines that the status of the associated notification device indicates that the notification device is not being used for its predetermined use, the method 200 includes generating, using the processor 136, the corrective activation signal and proceeding to block 216. If the processor 136 determines that the status of the associated notification device indicates that the notification device is being used for its predetermined use, the method 200 proceeds to block 218.

In the non-limiting example of FIG. 1, the method 200 may include determining, using the processor 136, that the status of the display device 110 (e.g., the HUD 112) includes an object 144 (e.g., a hat 146) placed on a dashboard 148 adjacent to the display device 110. The method 200 may further include comparing, using the processor 136, the status to the predetermined use threshold (e.g., the location of the hat 146 relative to the path of light emitted by the HUD 112). If the processor 136 determines that the HUD 112 is not being used with an unobstructed path of light, the method 200 includes generating, using the processor 136, the corrective activation signal and proceeding to block 216. If the processor 136 determines that the HUD 112 is being used with an unobstructed path of light, the method 200 proceeds to block 218.

In the non-limiting example of FIG. 2, the method 200 may include determining, using the processor 136, that the status of the speaker 120 includes the cargo item 150 (e.g., a box 152) placed on the passenger seat 154 adjacent to the speaker 120. The method 200 may further include comparing, using the processor 136, the status to the predetermined use threshold (e.g., the location of the cargo item 150 relative to a location of the speaker 120). If the processor 136 determines that the speaker 120 is obstructed, the method 200 includes generating, using the processor 136, the corrective activation signal and proceeding to block 216. If the processor 136 determines that the speaker 120 is not obstructed, the method 200 proceeds to block 218.

In the non-limiting example of FIG. 3, the method 200 may include determining, using the processor 136, that the status of the haptic device 124 includes the occupant 156 being spaced from the haptic device 124 and/or the thigh bolster 126. The method 200 further includes comparing, using processor 136, the status to the predetermined use threshold (e.g., the maximum distance threshold $D_{max}$ between the occupant 156 and the haptic device 124 for the occupant to perceive the alert). The method 200 may further include generating, using the processor 136, the corrective activation signal and proceeding to block 216, in response to the processor 136 determining that the haptic device 124 is not being used with the occupant's leg being positioned at the measured distance $D_{meas}$ within the maximum distance threshold $D_{max}$. If the processor 136 determines that the haptic device 124 is not obstructed, the method 200 proceeds to block 218.

At block 216, the method 200 further includes generating, using the associated notification device 106, in real-time the corrected notification in response to the associated notification device 106 receiving the corrective activation signal from the processor. The corrected notification has a corrected notification characteristic that is not below the predetermined quality threshold. In the non-limiting example of FIG. 1, the display device 110 in the center stack display device 114 may display the visual notification, such that occupant has an unobstructed line of sight to the visual notification and the processor 136 determines that the measured image setting is not below the predetermined image setting threshold. In the non-limiting example of FIG. 2, the speaker 120 that is blocked by the cargo item 150 may emit the audio notification at a higher volume, such that the microphone detects the audio notification and the processor determines that the measured SNR ratio is not below the predetermined SNR threshold.

The method 200 further includes generating, using one or more of the other notification devices 106, in real-time the corrective instruction in response to the associated notification device receiving the corrective activation signal from the processor 136. The corrective instruction instructs the occupant 156 to use the associated notification device based on the predetermined use. In the non-limiting example of FIG. 1, the speaker 120 may emit a spoken announcement that provides the corrective instruction that instructs the occupant to remove the obstruction from the display device 110 and the dashboard 148. In the non-limiting example of FIG. 2, the display device 110 provides the corrective instruction (e.g., a spoken announcement etc.) that instructs the occupant to remove the cargo item from the passenger seat 154 and the speaker 120. In the non-limiting example of FIG. 3, the speaker 120 provides the corrective instruction (e.g., a spoken announcement etc.) that instructs the occupant to position legs against the thigh bolster 126. The method 200 then returns to block 202.

At block 218, the method 200 further includes comparing, using the processor 136, the notification devices 106 to a list of available alternative modalities. For example, the processor 136 may determine that the speaker 120 and the haptic device 124 are available alternative modalities for the obstructed display device. If the processor 136 determines that the system includes other notification devices that provide available alternative modalities, the method 200 proceeds to block 220. If the processor 136 determines that the system does not include other notification devices that provide available alternative modalities, the method 200 proceeds to block 210.

At block 220, the method 200 further includes comparing, using the processor 136, a user ID of the occupant to a plurality of user profiles stored in the CRM. Each of the user profiles includes a list of associated preferred modalities. If the processor 136 determines that the occupant has a user ID with an associated user profile stored in the CRM 138, the processor 136 generates the user-specific activation signal, and the method 200 proceeds to block 222. If the processor 136 determines that the occupant does not have a user ID with an associated user profile stored in the CRM 138, the processor 136 generates the corrective activation signal, the method 200 proceeds to block 224.

At block 222, the method 200 further includes generating, using the notification device associated with the available alternative modality and one of the preferred modalities, in real-time a user-specific alert, in response to the notification device receiving the user-specific activation signal from the processor 136. For example, one occupant may have a user profile indicating that the occupant prefers the speaker 120 as an alternative modality relative to the obstructed display device 110 and prefers to exclude the haptic device as an alternative modality. The speaker 120 may emit the audio notification and the haptic device 124 may remain inactive, in response to receiving the user-specific activation signal from the processor 136.

At block 224, the method 200 further includes generating, using the notification device associated with the available alternative modality, in real-time a modified alert, in response to the notification device receiving corrective the modified activation signal from the processor 136. For example, one occupant may not have a user profile with any preferred modalities as an alternative modality relative to the obstructed display device 110 and prefers to exclude the haptic device as an alternative modality. The speaker 120 may emit the audio notification and the haptic device 124 may remain inactive and the haptic device 124 may generate the haptic notification, in response to the speaker 120 and the haptic device 124 receiving the modified activation signal from the processor 136.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor may be communicatively coupled to, e.g., via the vehicle communications module, more than one local processor, e.g., included in electronic processor units (ECUs) or the like included in the vehicle 100 for monitoring and/or controlling various vehicle components. The processor 136 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 136 may transmit messages to various devices in the vehicle 100 and/or receive messages from the various devices, e.g., vehicle sensors, actuators, vehicle components, a human machine interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle comprising:
   a system for generating, monitoring, and correcting an alert for an occupant of the vehicle, the system comprising:
   a plurality of notification devices for generating the alert, with the alert comprising at least one of a visual notification, an audio notification, and a haptic notification, wherein the notification devices are mounted to the vehicle and communicate with other vehicle systems including at least one of a side blind zone alert system, a low fuel alert system, a lane departure warning system, a forward collision alert system, a rear cross traffic alert system, and a hidden Vulnerable Road User alert system;

a plurality of on-board input devices for detecting the visual notification, the audio notification, and the haptic notification and generating a visual alert signal, an audio alert signal, and a haptic alert signal for an associated one of the visual notification, the audio notification, and the haptic notification, wherein the plurality of on-board input devices are mounted within an interior of the vehicle and include at least one of a camera, a microphone and a haptic sensor; and a computer comprising at least one processor electrically connected the notification devices, the computer further comprising a non-transitory computer readable storage medium (CRM) storing instructions such that the at least one processor is programmed to:

determine a notification characteristic based on one of the visual alert signal, the audio alert signal, and the haptic alert signal received from the associated notification device;

compare the notification characteristic to a predetermined quality threshold;

determine a priority level of the alert in response to the at least one processor determining that the notification characteristic is below the predetermined quality threshold;

compare the priority level to a predetermined priority level threshold; and generate a reporting activation signal in response to the at least one processor determining that the priority level is below the predetermined priority level threshold; and wherein at least one of the notification devices generates in real-time an error notification to indicate to the occupant that the notification characteristic is below the predetermined quality threshold in response to the associated notification device receiving the reporting activation signal from the at least one processor.

2. The vehicle of claim 1 wherein the at least one processor is further programmed to:

determine a status of the associated notification device in response to the at least one processor determining that the priority level is not below the predetermined priority level threshold;

compare the status to a predetermined use threshold for the associated notification device; and generate a corrective activation signal in response to the at least one processor determining that the associated notification device is not being used as intended such that the notification characteristic is below the predetermined quality threshold.

3. The vehicle of claim 2 wherein the associated notification device generates in real-time a corrected notification in response to the associated notification device receiving the corrective activation signal from the at least one processor, with the corrected notification having a corrected notification characteristic that is not below the predetermined quality threshold.

4. The vehicle of claim 2 wherein at least one of the other notification devices generates in real-time a corrective instruction in response to the associated notification device receiving the corrective activation signal from the at least one processor, with the corrective instruction instructing the occupant of the vehicle to use the associated notification device based on the predetermined use.

5. The vehicle of claim 2 wherein the at least one processor is further programmed to:

compare the plurality of notification devices to a list of alternative modalities; and compare a user ID of the occupant to a plurality of user profiles stored in the CRM, in response to the at least one processor determining that at least one of the notification devices comprises one of the alternative modalities, where each of the user profiles includes a list of associated preferred modalities; and generate a user-specific activation signal in response to the at least one processor determining that at least one of the notification devices comprises one of the alternative modalities and one of the preferred modalities;

wherein the notification device associated with one of the alternative modalities and one of the preferred modalities generates in real-time a user-specific alert in response to the notification device receiving the user-specific activation signal.

6. The vehicle of claim 5 wherein the at least one processor is further programmed to:

generate the corrective activation signal in response to the at least one processor determining that the notification devices do not comprise one of the alternative modalities and one of the preferred modalities.

7. The vehicle of claim 6 wherein the at least one processor is further programmed to store the error notification in the CRM.

8. The vehicle of claim 7 wherein the plurality of notification devices comprises a display device for generating the visual notification, a speaker for generating the audio notification, and a haptic device for generating the haptic notification.

9. The vehicle of claim 8 wherein the plurality of on-board input devices comprises a camera for generating the visual alert signal in response to the camera detecting the visual notification, a microphone for generating the audio alert signal in response to the microphone detecting the audio notification, and a haptic sensor for generating the haptic alert signal in response to the haptic sensor detecting the haptic notification.

10. A computer for a system of a vehicle, with the system generating, monitoring, and correcting an alert for an occupant of the vehicle, the computer comprising:

at least one processor electrically connected a plurality of notification devices of the system, with the notification devices generating the alert comprising at least one of a visual notification, an audio notification, and a haptic notification, wherein the notification devices are mounted to the vehicle and communicate with other vehicle systems including at least one of a side blind zone alert system, a low fuel alert system, a lane departure warning system, a forward collision alert system, a rear cross traffic alert system, and a hidden Vulnerable Road User alert system; and a non-transitory computer readable storage medium (CRM) storing instructions such that the at least one processor is programmed to:

determine a notification characteristic based on one of the visual alert signal, the audio alert signal, and the haptic alert signal received from the associated notification device;

compare the notification characteristic to a predetermined quality threshold;

determine a priority level of the alert in response to the at least one processor determining that the notification characteristic is below the predetermined quality threshold;

compare the priority level to a predetermined priority level threshold; and generate a reporting activation signal in response to the at least one processor determining that the priority level is below the predetermined priority level threshold; and wherein at least one of the notification devices generates in real-time an error notification to indicate to the occupant of the vehicle that the notification characteristic is below the predetermined quality threshold in response to the associated notification device receiving the reporting activation signal from the at least one processor.

11. The computer of claim 10 wherein the at least one processor is further programmed to:

determine a status of the associated notification device in response to the at least one processor determining that the priority level is not below the predetermined priority level threshold;

compare the status to a predetermined use threshold for the associated notification device; and generate a corrective activation signal in response to the at least one processor determining that the associated notification device is not being used as intended such that the notification characteristic is below the predetermined quality threshold.

12. The computer of claim 11 wherein the associated notification device generates in real-time a corrected notification in response to the associated notification device receiving the corrective activation signal from the at least one processor, with the corrected notification having a corrected notification characteristic that is not below the predetermined quality threshold.

13. The computer of claim 11 wherein at least one of the other notification devices generates in real-time a corrective instruction in response to the associated notification device receiving the corrective activation signal from the at least one processor, with the corrective instruction instructing the occupant of the vehicle to use the associated notification device based on the predetermined use.

14. The computer of claim 11 wherein the at least one processor is further programmed to:

compare the plurality of notification devices to a list of alternative modalities;

compare a user ID of the occupant to a plurality of user profiles stored in the CRM, in response to the at least one processor determining that at least one of the notification devices comprises one of the alternative modalities, where each of the user profiles includes a list of associated preferred modalities; and generate a user-specific activation signal in response to the at least one processor determining that at least one of the notification devices comprises one of the alternative modalities and one of the preferred modalities;

wherein the notification device associated with one of the alternative modalities and one of the preferred modalities generates in real-time a user-specific alert in response to the notification device receiving the user-specific activation signal.

15. The computer of claim 14 wherein the at least one processor is further programmed to:

generate the corrective activation signal in response to the at least one processor determining that the notification devices do not comprise one of the alternative modalities and one of the preferred modalities.

16. The computer of claim 15 wherein the at least one processor is further programmed to store the error notification in the CRM.

17. A method of operating a vehicle having a system, the method comprising:

generating, using a plurality of notification devices of the system, an alert for an occupant of the vehicle, with the alert comprising at least one of a visual notification, an audio notification, and a haptic notification, wherein the notification devices are mounted to the vehicle and communicate with other vehicle systems including at least one of a side blind zone alert system, a low fuel alert system, a lane departure warning system, a forward collision alert system, a rear cross traffic alert system, and a hidden Vulnerable Road User alert system;

generating, using a plurality of on-board input devices of the system, a visual alert signal, an audio alert signal, and a haptic alert signal for an associated one of the visual notification, the audio notification, and the haptic notification, wherein the plurality of on-board input devices are mounted within an interior of the vehicle and include at least one of a camera, a microphone and a haptic sensor;

determining, using at least one processor of a computer for the system, a notification characteristic based on one of the visual alert signal, the audio alert signal, and the haptic alert signal received from the associated notification device, with the computer further including a non-transitory computer readable storage medium (CRM) storing instructions;

comparing, using the at least one processor, the notification characteristic to a predetermined quality threshold;

determining, using the at least one processor, a priority level of the alert in response to the at least one processor determining that the notification characteristic is below the predetermined quality threshold;

comparing, using the at least one processor, the priority level to a predetermined priority level threshold;

generating, using the at least one processor, a reporting activation signal in response to the at least one processor determining that the priority level is below the predetermined priority level threshold; and generating, using at least one of the notification devices, in real-time an error notification to indicate to the occupant that the notification characteristic is below the predetermined quality threshold in response to the associated notification device receiving the reporting activation signal from the at least one processor.

18. The method of claim 17 further comprising:

determining, using at least one processor, a status of the associated notification device in response to the at least one processor determining that the priority level is not below the predetermined priority level threshold;

comparing, using at least one processor, the status to a predetermined use threshold for the associated notification device; and generating, using at least one processor, a corrective activation signal in response to the at least one processor determining that the associated notification device is not being used as intended such that the notification characteristic is below the predetermined quality threshold.

19. The method of claim 18 further comprising:
comparing, using at least one processor, the plurality of notification devices to a list of alternative modalities;
comparing, using at least one processor, a user ID of the occupant to a plurality of user profiles stored in the CRM, in response to the at least one processor determining that at least one of the notification devices comprises one of the alternative modalities, where each of the user profiles includes a list of associated preferred modalities;
generating, using at least one processor, a user-specific activation signal in response to the at least one processor determining that at least one of the notification devices comprises one of the alternative modalities and one of the preferred modalities; and
generating, using the notification device associated with one of the alternative modalities and one of the preferred modalities, in real-time a user-specific alert in response to the notification device receiving the user-specific activation signal.

20. The method of claim 19 further comprising:
generating, using the at least one processor, the corrective activation signal in response to the at least one processor determining that the notification devices do not comprise one of the alternative modalities and one of the preferred modalities.

* * * * *